(12) United States Patent
Hughes et al.

(10) Patent No.: US 10,907,224 B2
(45) Date of Patent: Feb. 2, 2021

(54) DIRECT REDUCTION SYSTEM AND PROCESS UTILIZING A PROCESS GAS DIRECT RECYCLE LINE

(71) Applicant: Midrex Technologies, Inc., Charlotte, NC (US)

(72) Inventors: Gregory Darel Hughes, Charlotte, NC (US); Haruyasu Michishita, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 279 days.

(21) Appl. No.: 16/007,045

(22) Filed: Jun. 13, 2018

(65) Prior Publication Data

US 2019/0382857 A1    Dec. 19, 2019

(51) Int. Cl.
*C21B 13/02*    (2006.01)
(52) U.S. Cl.
CPC .......... *C21B 13/02* (2013.01); *C21B 2100/40* (2017.05)
(58) Field of Classification Search
CPC ... C21B 13/0073; C21B 13/02; C21B 13/029; C21B 2100/40; C21B 2100/64
USPC ............... 266/197, 156; 75/496, 559
See application file for complete search history.

(56) References Cited

U.S. PATENT DOCUMENTS

| | | | | |
|---|---|---|---|---|
| 3,764,123 A * | 10/1973 | Beggs | .................. | C21B 13/029 266/140 |
| 4,046,557 A * | 9/1977 | Beggs | .................. | C21B 13/02 75/490 |
| 4,439,233 A | 3/1984 | Faccone | | |
| 4,591,380 A * | 5/1986 | Summers | ............. | C21B 13/0073 75/496 |
| 5,618,032 A | 4/1997 | Meissner et al. | | |
| 8,771,638 B2 * | 7/2014 | Metius | .................. | C01B 3/384 252/373 |
| 2011/0277591 A1 | 11/2011 | Metius et al. | | |
| 2016/0168653 A1 | 6/2016 | Metius et al. | | |

OTHER PUBLICATIONS

Sep. 6, 2018 International Search Report issued for International Application No. PCT/US18/40676.

* cited by examiner

*Primary Examiner* — Jessee R Roe
*Assistant Examiner* — Michael Aboagye
(74) *Attorney, Agent, or Firm* — Clements Bernard Walker; Christopher L. Bernard

(57) ABSTRACT

A direct reduction system and process for reducing a metal oxide to a metal, including and utilizing: a process gas line configured to deliver a portion of a process gas to a reformer operable for reforming the process gas to form a reformed gas; a bustle gas line configured to deliver the reformed gas to a shaft furnace as a bustle gas, wherein the shaft furnace is operable for reducing the metal oxide to the metal; and a direct recycle line including a direct recycle cooler configured to selectively deliver a portion of the process gas to the bustle gas line while circumventing the reformer, thereby selectively cooling and lowering the moisture content of the bustle gas delivered to the shaft furnace. Optionally, the direct reduction system further includes a reheat line configured to deliver a portion of the bustle gas to the shaft furnace as reheat gas.

10 Claims, 3 Drawing Sheets

DIRECT REDUCTION SYSTEM AND PROCESS UTILIZING A PROCESS GAS DIRECT RECYCLE LINE

FIELD OF THE INVENTION

The present invention relates generally to a direct reduction (DR) system and process. More specifically, the present invention relates to a DR system and process utilizing a process gas direct recycle line (DRL). The present invention finds applicability in the production of direct reduced iron (DRI) or the like in a shaft furnace (SF), well known to those of ordinary skill in the art.

BACKGROUND OF THE INVENTION

FIG. 1 illustrates a conventional DR process 10, in which "reformed gas" 12 from a reformer 14, mostly $H_2$ and CO made by natural gas reforming, is mixed with $O_2$ and enrichment natural gas to form "bustle gas" 16, which is fed through a bustle and tuyere system into the SF to reduce iron oxide to metallized iron, for example. Prior to the iron oxide tolerating higher bustle gas temperatures, mostly due to sintering or melting in the SF, bustle gas 16 was typically tempered before going into the SF. Recently, lime or cement coating on the iron oxide has been implemented to facilitate the use of higher bustle gas temperatures. This coating inhibits sintering or sticking of metallized iron material, hence, the bustle gas 16 can now be introduced to the SF without tempering. The temperature of the bustle gas 16 used to be 800~850° C., but now 950~980° C. is possible with the use of oxide coating, while the temperature of the reformed gas 12 is around 950° C.

During startup with the cold iron oxide filled initially in the SF, lower bustle gas temperatures (typically 700~750° C.) must be applied to avoid the clustering or melting of the material in the SF. It is typically a problem soon after starting to introduce the reductant/hydrocarbon (i.e., natural gas) to the gas re-circulating through the reformer 14 and SF since the reducing reaction from $Fe_2O_3$ to $Fe_3O_4$ with CO or $H_2$ is exothermic. The iron oxide is normally in an indurated pellet and formed primarily of Hematite ($Fe_2O_3$). Until the iron oxide ($Fe_2O_3$) charged into the SF becomes $Fe_3O_4$ or FeO, the burden temperature continues to rise. It is difficult to control or inhibit the burden temperature rise until it passes the peak temperature, called the "oxide peak," due to the large mass of iron oxide in the SF. To survive the oxide peak without clustering, a lower bustle gas temperature must be utilized to maintain the peak burden temperature lower than the melting or sintering point of the material. Note that the temperatures of the reformed gas 12 and the reformer 14 are not very flexible. With the reformed gas temperature maintained at 950° C. to prevent carbon deposition in the reformer 14, the bustle gas temperature is tempered to 700~750° C. downstream of the reformer 14.

FIG. 1 illustrates the current system, where a reformed gas cooler (RGC) 18, a direct water-quenching, packed-bed cooler or the like, is installed in parallel to the bustle gas line 16. The temperature of the bustle gas 16 is lowered and controlled before going to the SF by mixing a cooled sidestream of bustle gas 20 coming through the RGC 18 with the hot bustle gas 16 bypassing the RGC 18. A flow restriction 22, such as a brick orifice or a hot valve, must be installed in the bypassing line 20 to provide the pressure drop needed to drive sufficient flow through the RGC 18.

Starting up with the iron oxide in the SF seldom happens, perhaps as often as once or twice a year. During normal plant operation, the RGC 18 is idled and no hot gas is fed to the RGC 18 by shutting off an isolation valve 24, but the cooling water continues to be supplied by the pump. The biological fouling of the RGC packing is also a concern, since the temperature in RGC 18 is favorable for bacteria to grow during the idling. The temperature in the RGC 18 used to be high enough to mitigate the growth of bacteria when the RGC 18 was operated during normal plant operation prior to the use of oxide coating. The cooling water supplied to the RGC 18 cannot be stopped because it prevents the RGC 18 from being overheated by the hot bustle gas 16 leaking through the isolation valve 24 of a large diameter, such as 600 mm or more.

Some SFs have a reheat line 26 to heat up the material in the bottom of the SF, where a part of the hot reformed gas 12 is injected. The reheat line 26 is a long refractory-lined duct designed to take the hot reducing gas 12 from a higher pressure point, which is upstream of the RGC 18 and the brick orifice 22.

Other SFs that do not have a reheat line 26 are basically losing energy when the brick orifice (i.e., fixed orifice) 22 is applied. The adjustable flow restriction of a hot valve 22 has been applied at several plants to reduce the pressure drop when idling the RGC 18. Oftentimes, this hot valve 22 will not move when needed. The large mechanical valve 22 gets deformed after being exposed to high temperatures in a stationary position for long periods of time or when sufficient cooling water is not provided during normal operation.

Thus, whether a reheat line 26 is installed or not, due to the higher pressure (typically 1.5 barg) of the bustle gas 16 and the lower installation level of the RGC 18, the RGC 18 requires a deep underground barometric seal leg pipe to drain the water and seal the pressure. Further, to prevent overheating of the RGC 18 by leakage through the RGC isolation valve 24, the cooling water must be continuously supplied to the RGC 18. This causes RGC packing fouling via biological bacteria. Still further, the continuous cooling water supply increases the electricity consumption for the pump.

With the reheat line 26, due to the location of the RGC 18 and the brick orifice or the hot valve 22 close to the reformer 14, a longer refractory duct is required for reheat line 26. This increases capital cost and reduces the heating performance of the reheat line 26 due to higher heat loss from the duct surface.

Without the reheat line 26, the brick orifice 22 increases the pressure drop in the bustle gas line 16, which increases the compressor duty. A mechanical adjustable hot valve 22 could be applied instead of the brick orifice 22, but it often does not work properly due to the high temperature exposure and the lower operation frequency.

BRIEF SUMMARY OF THE INVENTION

Referring now specifically to FIGS. 1 and 2, in various exemplary embodiments, the present invention resolves the issues highlighted above. The concepts of the present invention are most applicable in cases when the bustle gas 16 is tempered less frequently, such as during the start-up period.

The RGC 18 and the flow restriction 22, such as the brick orifice, are replaced by a direct recycle line 28 with another packed bed cooler, the direct recycle cooler (DRC) 30. The DRC 30 reduces the temperature (typically 180° C.) and moisture (typically 10-15%) of the process gas 32 discharged from the compressor 34. Cooled process gas 32 is mixed with the hot reformed gas 12 to lower the temperature and moisture in bustle gas 16 going to the SF. The moisture reduction of the bustle gas 16 is important to prevent the re-oxidation of the material in the SF, which could cause a significant plant outage and increase the amount of off-spec product.

The DRC 30 is installed at an elevation high enough to eliminate the need for underground barometric seal leg piping since the DRC 30 can be laid out flexibly or independently from the SF and the reformer 18 by routing the simple carbon steel duct. A U-leg barometric seal leg arrangement would be employed instead.

The cooling water can be stopped during the idling of the DRC 30 or a normal plant operation period since the DRC 30 has no overheat issue with the lower entering gas temperature. This saves the electricity consumed by the pump and eliminates the packing fouling by biological bacteria.

Replacing the RGC 18 to cool 900° C. bustle gas 16 with the DRC 30 to cool 180° C. process gas 32 eliminates the refractory-lined duct around the RGC 18 and reduces the size of the packed bed cooler.

With the reheat line 26, the elimination of the RGC 18 enables the reheat line 26 to be branched from the bustle gas line 16 much closer to the SF. The shorter length of the refractory-lined duct reduces the capital cost. It also reduces the heat loss from the reheat line to increase the discharge temperature of the hot DRI and save electricity consumption at the electric arc furnace. In the case of hot-briquetted iron (HBI) plants, it can reduce the amount of unbriquetted product due to low discharge temperature.

Without the reheat line 26, the elimination of the RGC 18 and the brick orifice 22 in the bustle gas line 16 reduces the pressure drop to save electricity consumption for the compressor 34 during the normal operation period. Alternatively, it will eliminate the mechanical adjustable hot valve 22 in case it is installed instead of the brick orifice 22.

In one exemplary embodiment, the present invention provides a direct reduction system for reducing a metal oxide to a metal, including: a process gas line configured to deliver a portion of a process gas to a reformer operable for reforming the process gas to form a reformed gas; a bustle gas line configured to deliver the reformed gas to a shaft furnace as a bustle gas, wherein the shaft furnace is operable for reducing the metal oxide to the metal; and a direct recycle line including a direct recycle cooler configured to selectively deliver a portion of the process gas to the bustle gas line while circumventing the reformer, thereby selectively cooling and lowering the moisture content of the bustle gas delivered to the shaft furnace. The process gas line includes a process gas compressor operable for compressing the process gas prior to the delivery of the process gas to the direct recycle cooler and/or the reformer. The process gas line further includes a process gas preheater operable for preheating the portion of the process gas prior to the delivery of the portion of the process gas to the reformer. The process gas line still further includes a flow control valve operable for selectively enabling/disabling a flow of the portion of the process gas to the direct recycle cooler. The direct recycle line includes a duct assembly that is disposed at an elevation high enough to maintain a water seal length using a U-leg design without an underground seal leg. The direct recycle cooler includes a packed bed cooler. Optionally, the direct reduction system further includes a reheat line configured to deliver a portion of the bustle gas to the shaft furnace as reheat gas, wherein the reheat line is coupled to the bustle gas line between the direct recycle line and the shaft furnace. The bustle gas line includes a flow restrictor operable for selectively directing the portion of the bustle gas into the reheat line. The direct recycle line and the direct recycle cooler are collectively operable for delivering the portion of the process gas to the bustle gas line and selectively cooling the bustle gas delivered to the shaft furnace from 950~980° C. to 700~950° C. The direct recycle line and the direct recycle cooler are collectively operable for delivering the portion of the process gas to the bustle gas line and selectively drying the bustle gas delivered to the shaft furnace from 5~15% $H_2O$ to 4~6% $H_2O$.

In another exemplary embodiment, the present invention provides a direct reduction process for reducing a metal oxide to a metal, including: via a process gas line, delivering a portion of a process gas to a reformer operable for reforming the process gas to form a reformed gas; via a bustle gas line, delivering the reformed gas to a shaft furnace as a bustle gas, wherein the shaft furnace is operable for reducing the metal oxide to the metal; and, via a direct recycle line including a direct recycle cooler, selectively delivering a portion of the process gas to the bustle gas line while circumventing the reformer, thereby selectively cooling and lowering the moisture content of the bustle gas delivered to the shaft furnace. The process gas line includes a process gas compressor operable for compressing the process gas prior to the delivery of the process gas to the direct recycle cooler and/or the reformer. The process gas line further includes a process gas preheater operable for preheating the portion of the process gas prior to the delivery of the portion of the process gas to the reformer. The process gas line still further includes a flow control valve operable for selectively enabling/disabling a flow of the portion of the process gas to the direct recycle cooler. The direct recycle line includes a duct assembly that is disposed at an elevation high enough to maintain a water seal length using a U-leg design without an underground seal leg. The direct recycle cooler includes a packed bed cooler. Optionally, the direct reduction process further includes, via a reheat line, delivering a portion of the bustle gas to the shaft furnace as reheat gas, wherein the reheat line is coupled to the bustle gas line between the direct recycle line and the shaft furnace. The bustle gas line includes a flow restrictor operable for selectively directing the portion of the bustle gas into the reheat line. The direct recycle line and the direct recycle cooler are collectively operable for delivering the portion of the process gas to the bustle gas line and selectively cooling the bustle gas delivered to the shaft furnace from 950~980° C. to 700~950° C. The direct recycle line and the direct recycle cooler are collectively operable for delivering the portion of the process gas to the bustle gas line and selectively drying the bustle gas delivered to the shaft furnace from 5~15% $H_2O$ to 4~6% $H_2O$.

BRIEF DESCRIPTION OF THE DRAWINGS

The present invention is illustrated and described herein with reference to the various drawings, in which like reference numbers are used to denote like system components/process steps, as appropriate, and in which.

DETAILED DESCRIPTION OF THE INVENTION

Figure 2:
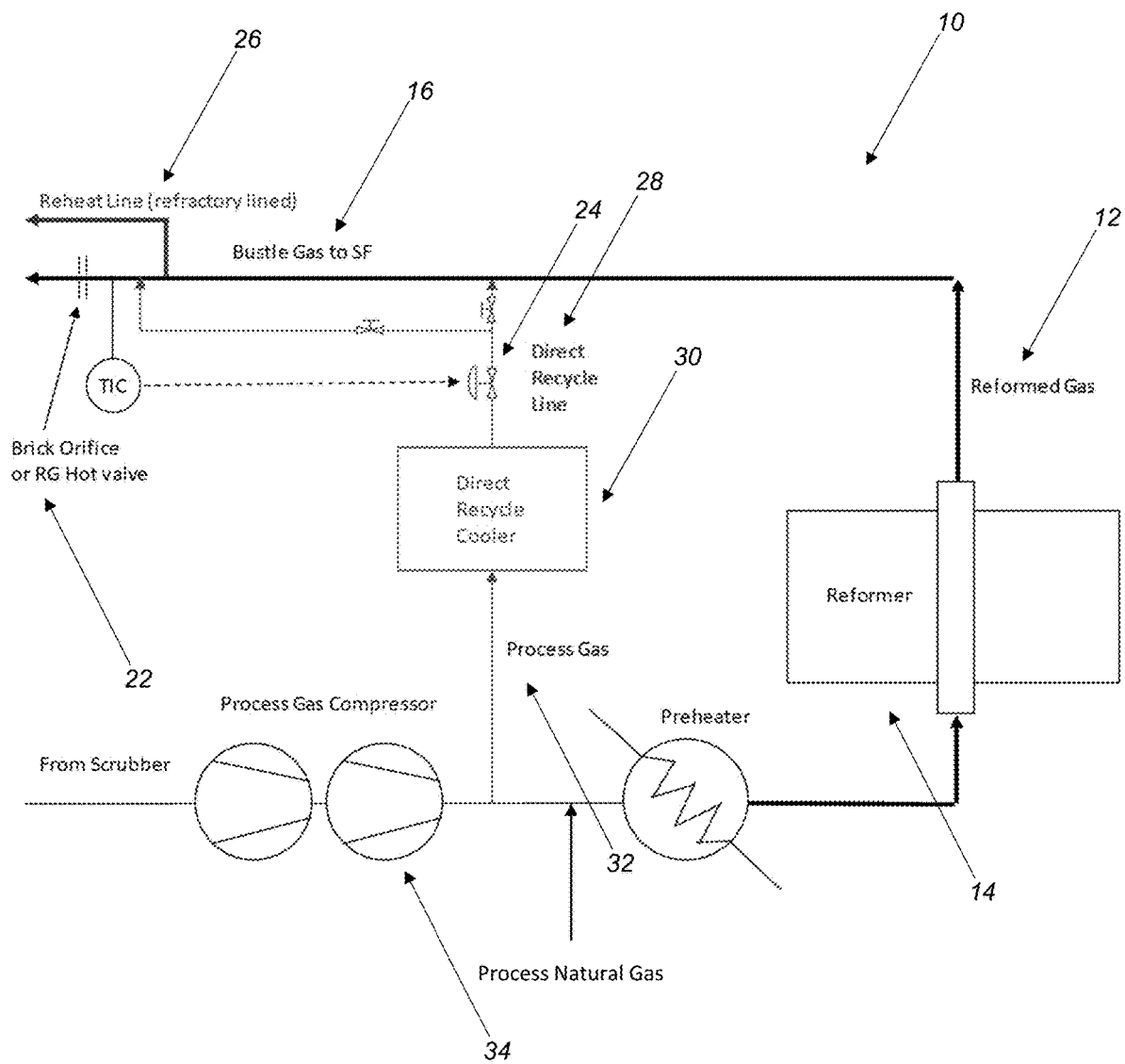
FIG. 2 is a schematic diagram illustrating one exemplary embodiment of the DR process of the present invention, utilizing a direct recycle line 28, a DRC 30, and a reheat line 26.
Figure 3:
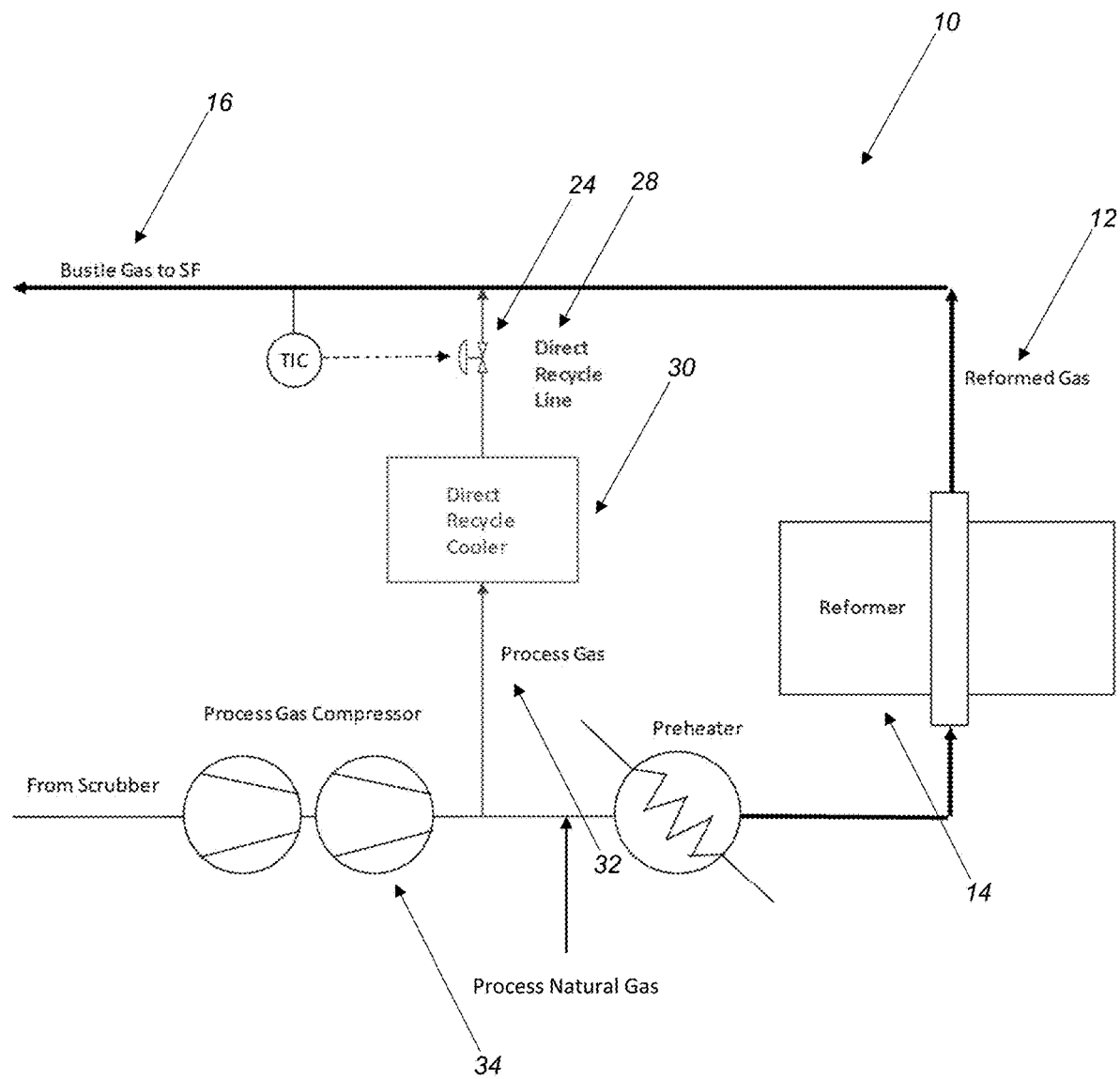
FIG. 3 is a schematic diagram illustrating another exemplary embodiment of the DR process of the present invention, utilizing a direct recycle line 28 and a DRC 30.

Referring now specifically to FIGS. 2 and 3, related generally to tempering the bustle gas 16 during a start-up period, when starting-up with the SF entirely filled with cold iron oxide or the like, the temperature of the bustle gas 16 introduced into the SF must be controlled at typically 700~750° C. and the lower moisture content of the bustle gas 16 must be maintained to avoid the melting or oxidation of the material, as mentioned herein above. A part of the process gas 32 from the process gas compressor 34 bypasses the reformer 14 to be mixed with the hot reformed gas 12. This bypass is again called the "direct recycle line" 28. The packed bed cooler (DRC) 30 is installed in the direct recycle line 28 to lower the temperature and the moisture content of the process gas 32, typically from 180° C. and 10~15% $H_2O$ to less than 40° C. and 1.5~2% $H_2O$. During the start-up period, the flow rate introduced to the DRC 30 is regulated by the flow control valve 24 to maintain the target bustle gas temperature. During normal plant operation, when no tempering of the bustle gas 16 is required, no process gas 32 is introduced to the DRC 30 or mixed with the reformed gas 12. The flow control valve or shut-off valve 24 is closed completely. Advantageously, no cooling water is supplied while the DRC 30 is idled. Due to the lower temperature and higher pressure of the direct recycle line 28, the diameter of the control valve 24 is smaller, such as 400 mm or less. Better sealing performance is thus expected when the valve 24 is closed. Even if a small leakage does occur with the valve 24, it will not influence the overall process 10.

Figure 1:
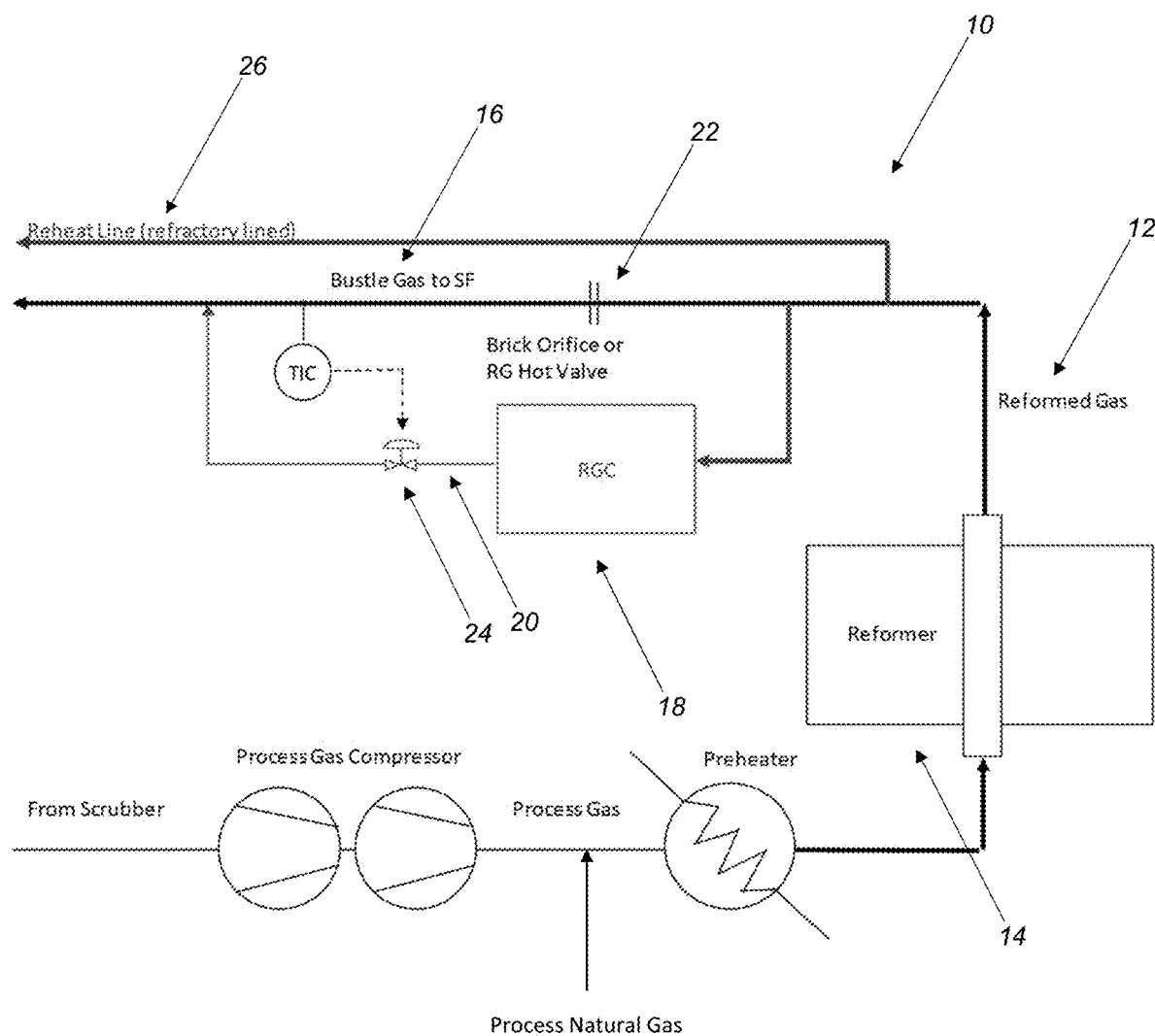
FIG. 1 is a schematic diagram illustrating a conventional DR process, utilizing a RGC 18 and a reheat line 26.

The direct recycle line 28 is made of a carbon steel duct or the like. Advantageously, the DRC 30 has no refractory parts and a smaller diameter than the RGC 18 (FIG. 1). The location of the DRC 30 is flexible without the refractory-lined duct or the restriction of the reformer location. It can be somewhere between the process gas compressor 34 and the bustle gas line 16 to the SF. By locating the DRC 30 at an elevation high enough to maintain the water seal length using a U-leg design, for example, no underground seal leg is required. The DRC 30 has the seal leg to discharge the water and seal the pressure, typically 1.5~2 barg.

FIG. 2 illustrates the flowsheet with direct recycle in the case where a reheat line 26 is applied to heat up the material in the SF. The reheat line 26 can be branched from the bustle gas line 16 at a point close to the SF, which makes the duct shorter for the reheat line 26. This reduces the capital cost and the heat loss. The flow restriction brick orifice 22 is placed at the bustle gas line 16 between the SF and the branch to maintain the flow rate of the reheat line 26, but it does not have as much pressure drop as that with the current RGC 18. Direct recycle gas 28 cooled by the DRC 30 can be introduced into the bustle gas 16 downstream of the reformer 14 and/or downstream of the reheat line branch.

FIG. 3 illustrates the flowsheet with direct recycle in the case where a reheat line 26 (FIGS. 1 and 2) is not applied. No flow restriction 22 (FIGS. 1 and 2) is installed in the bustle gas line 16 accordingly. Thus, the corresponding electricity consumption for the process gas compressor 34 is saved.

Again, referring now to all FIGS. 1-3, the RGC 18 and the flow restriction 22, such as the brick orifice, are replaced by a direct recycle line 28 with another packed bed cooler, the DRC 30. The DRC 30 reduces the temperature (typically 180° C.) and moisture (typically 15%) of the process gas 32 discharged from the process gas compressor 34. Cooled process gas 32 is mixed with the hot reformed gas 12 to lower the temperature and moisture in bustle gas 16 going to the SF. The moisture reduction of the bustle gas 16 is important to prevent the re-oxidation of the material in the SF, which could cause a significant plant outage and increase the amount of off-spec product.

The DRC 30 is installed at an elevation high enough to eliminate the need for underground barometric seal leg piping since the DRC 30 can be laid out flexibly or independently from the SF and the reformer 18 by routing the simple carbon steel duct. A U-leg barometric seal leg arrangement is employed instead.

The cooling water can be stopped during the idling of the DRC 30 or a normal plant operation period since the DRC 30 has no overheat issue with the lower entering gas temperature. This saves the electricity consumed by the pump and eliminates the packing fouling by biological bacteria.

Replacing the RGC 18 to cool 900+° C. reformed gas 12 with the DRC 30 to cool 180° C. process gas 32 eliminates the refractory-lined duct around the RGC 18 and reduces the size of the packed bed cooler.

With the reheat line 26, the elimination of the RGC 18 enables the reheat line 26 to be branched from the bustle gas line 16 much closer to the SF. The shorter length of the refractory-lined duct reduces the capital cost. It also reduces the heat loss from the reheat line to increase the discharge temperature of the hot DRI and save electricity consumption at the electric arc furnace. In the case of HBI plants, it can reduce the amount of unbriquetted product due to low discharge temperature.

Without the reheat line 26, the elimination of the RGC 18 and the brick orifice 22 in the bustle gas line 16 reduces the pressure drop to save electricity consumption for the process gas compressor 34 during the normal operation period. Alternatively, it will eliminate the mechanical adjustable hot valve 22 in case it is installed instead of the brick orifice 22.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A direct reduction system for reducing a metal oxide to a metal, comprising:
   a process gas line configured to deliver a portion of a process gas to a reformer operable for reforming the process gas to form a reformed gas;
   a bustle gas line configured to deliver the reformed gas to a shaft furnace as a bustle gas, wherein the shaft furnace is operable for reducing the metal oxide to the metal; and
   a direct recycle line comprising a direct recycle cooler configured to selectively deliver a portion of the process gas to the bustle gas line while circumventing the reformer, thereby selectively cooling and lowering a moisture content of the bustle gas delivered to the shaft furnace;
   wherein the portion of the process gas delivered to the bustle gas line by the direct recycle line is cooled in the direct recycle cooler, while the portion of the process gas delivered to the reformer by the process gas line is not.

2. The direct reduction system of claim 1, wherein the process gas line comprises a process gas compressor operable for compressing the process gas prior to the delivery of the process gas to the direct recycle cooler and/or the reformer.

3. The direct reduction system of claim 1, wherein the process gas line comprises a process gas preheater operable for preheating the portion of the process gas prior to the delivery of the portion of the process gas to the reformer.

4. The direct reduction system of claim 1, wherein the process gas line comprises a flow control valve operable for selectively enabling/disabling a flow of the portion of the process gas to the direct recycle line.

5. The direct reduction system of claim 1, wherein the direct recycle line comprises a duct assembly that is disposed at an elevation high enough to maintain a water seal length using a U-leg design without an underground seal leg.

6. The direct reduction system of claim 1, wherein the direct recycle cooler comprises a packed bed cooler.

7. The direct reduction system of claim 1, further comprising a reheat line configured to deliver a portion of the bustle gas to the shaft furnace as reheat gas, wherein the reheat line is coupled to the bustle gas line between the direct recycle line and the shaft furnace.

8. The direct reduction system of claim 7, wherein the bustle gas line comprises a flow restrictor operable for selectively directing the portion of the bustle gas into the reheat line.

9. The direct reduction system of claim 1, wherein the direct recycle line and the direct recycle cooler are collectively operable for delivering the portion of the process gas to the bustle gas line and selectively cooling the bustle gas delivered to the shaft furnace from 950~980° C. to 700~less than 950° C.

10. The direct reduction system of claim 1, wherein the direct recycle line and the direct recycle cooler are collectively operable for delivering the portion of the process gas to the bustle gas line and selectively drying the bustle gas delivered to the shaft furnace from 5~15% $H_2O$ to 4~6% $H_2O$.

* * * * *